(12) United States Patent
Holdman et al.

(10) Patent No.: US 8,250,325 B2
(45) Date of Patent: Aug. 21, 2012

(54) DATA DEDUPLICATION DICTIONARY SYSTEM

(75) Inventors: Jon Mark Holdman, Wheat Ridge, CO (US); Robert Michael Raymond, Boulder, CO (US); Atiq Ahamad, Superior, CO (US); John Richard Kostraba, Jr., Broomfield, CO (US); Carl T. Madison, Jr., Windsor, CO (US)

(73) Assignee: Oracle International Corporation, Redwood City, CA (US)

( * ) Notice: Subject to any disclaimer, the term of this patent is extended or adjusted under 35 U.S.C. 154(b) by 295 days.

(21) Appl. No.: 12/752,308

(22) Filed: Apr. 1, 2010

(65) Prior Publication Data

US 2011/0246741 A1    Oct. 6, 2011

(51) Int. Cl.
*G06F 13/00* (2006.01)
(52) U.S. Cl. .............................. 711/162; 711/E12.009
(58) Field of Classification Search .................... None
See application file for complete search history.

(56) References Cited

U.S. PATENT DOCUMENTS

| 5,990,810 | A | 11/1999 | Williams |  |
|---|---|---|---|---|
| 6,928,526 | B1 | 8/2005 | Zhu et al. |  |
| 2009/0287901 | A1* | 11/2009 | Abali et al. | 711/206 |
| 2010/0106691 | A1* | 4/2010 | Preslan et al. | 707/674 |
| 2011/0107052 | A1* | 5/2011 | Narayanasamy | 711/171 |
| 2011/0231362 | A1* | 9/2011 | Attarde et al. | 707/609 |

OTHER PUBLICATIONS

Joerg Moellenkamp, Pondering the Dedup Process: Synchronous or Asynchronous, Solaris, Mar. 4, 2010, vol. 145, Issue 1, Article 22838.
Benjamin Zhu, Kai Li, Hugo Patterson, Avoiding the Disk Bottleneck in the Data Domain Deduplication File System, Fast '08: 6th USENIX Conference on File and Storage Technologies, pp. 269-282.
Mark Lillibridge, Kave Eshghi, Deepavali Bhagwat, Vinay Deolalikar, Greg Trezise, Peter Camble, Sparce Indexing: Large Scale Inline Deduplication Using Sampling and Locality, Fast '09 7th USENIX Conference on File and Storage Technologies, San Francisco, Feb. 24-27, 2009,.
Deepavali Bhagwat, Kave Eshghi, Darrell D.E. Long, Mark Lillibridge, Extreme Binning: Scalable, Parallel Deduplication for Chunk-based File Backup, IEEE Mascots, 2009, London, UK, Sep. 21, 2009.

* cited by examiner

*Primary Examiner* — Edward Dudek, Jr.
*Assistant Examiner* — Sean D Rossiter
(74) *Attorney, Agent, or Firm* — Marsh Fischmann & Breyfogle, LLP; Kent A. Lembke

(57) ABSTRACT

A data deduplication method using a small hash digest dictionary in fast-access memory. The method includes receiving customer data, dividing the data into smaller chunks, and assigning hash values to each chunk. For each chunk, the method includes performing lookup for a duplicate chunk by accessing a small dictionary in memory with the chunk's hash value. When no entry, the small dictionary is updated to include the hash value to fill the dictionary with earliest received data. When an entry is found, the entry's hash value is compared with lookup value and if matched, reference data is returned and an entry counter is incremented. If not matched, additional accesses are attempted such as with additional indexes calculated using the hash value. Collisions may trigger an entry replacement such that some initially entered entries are replaced when determined to not be most repeating values such as based on their counter value.

18 Claims, 4 Drawing Sheets

DATA DEDUPLICATION DICTIONARY SYSTEM

BACKGROUND

1. Field of the Description

The present invention relates, in general, to data storage and reduction or control of redundant data, and, more particularly, to a method and system of performing in-line data deduplication that includes storing and using a small lookup dictionary in a fast storage medium (e.g., main memory, memory or data storage quickly accessible by a processor, or the like) to store the hashes determined to be the most repeating and a large total hash repository (or large lookup dictionary) on a slower storage medium (e.g., disk, flash, or the like). The data deduplication method and system may provide a mechanism for updating the small lookup dictionary with the most repeating hashes determined via periodic processing of the large lookup dictionary.

2. Relevant Background

The amount and type of data storage is rapidly expanding, and data management is rapidly becoming a significant cost for many businesses or enterprises. Particularly, enterprise data is growing exponentially, and today's businesses need a way to dramatically reduce costs associated with data storage and management. Enterprises also have to provide proper data back up to meet their needs including servicing clients and complying with regulations and laws regarding maintaining data for relatively long periods of time. A complication for most businesses is the enterprise data may be highly dispersed over many machines, data storage centers, and interconnected networks/systems.

Data deduplication may be used to lower overall costs of physical data storage by storing only a single instance of unique data (e.g., only one copy of particular data such as a file or data object is stored) for an enterprise or group sharing access to data. Deduplication is fast becoming a standard feature in many data storage systems, but existing data deduplication techniques have a number of limitations including accessing slower media such as disk or other memory to identify if some data is already stored.

Data deduplication generally is used to refer to the elimination of redundant data. In the deduplication process, duplicate data is not stored so as to retain only one copy or instance of the data in storage. For example, a single copy of a document, an image, an e-mail, a spreadsheet, a data block, or a data object for which there may have been numerous copies on a system may be stored in one or more data stores/data storage devices accessible by workers or operators in an enterprise such as a typical business. In many deduplication processes, a dictionary of the data already ingested or stored in the system is provided that includes key-value pairs providing a key for identifying the data and a value that provides a location of the data (or a pointer/reference to the remote data location). The key or signature for a data object (e.g., a file or block for a file system) is often generated by creating a hash of the object and then an index of such signature is created for use in lookups and comparison. Then, deduplication may involve comparing a hash or signature of a new or ingested file with hashes or signatures of existing files or data blocks in data storage. When files/objects with identical hashes or signatures are identified, the copy of matching data is replaced with pointers that point to the old or single stored instance.

Deduplication solutions often work by comparing chunks or blocks of data to detect duplicates. For that to happen, each chunk of data is assigned a presumably unique identification (e.g., a signature or fingerprint provided by a unique identifier mechanism/software that may include a cryptographic hash function). A requirement of these functions is that if the data contained in two chunks is identical the signatures for two chunks of data are also identical. Hence, if a lookup or comparison mechanism determines that a signature for a block or chunk of data being processed already exists in the dictionary (or deduplication namespace), then it will be easy enough to map the signature to the underlying chunk and replace the duplicate chunk with a link. Upon read back of the file, wherever a link is found, the system simply replaces the link with the referenced data chunk. The deduplication process is typically transparent to end users and applications.

Deduplication is useful as it is able to reduce the required storage capacity as only unique data is stored. In an e-mail example for an enterprise, a typical e-mail system may contain one thousand instances of the same one megabyte file attachment. If the e-mail system is backed up or archived, all data is stored with all one thousand instances of the attachment being saved in data storage, which requires one thousand megabytes. However, with data deduplication, only one instance of the attachment is actually stored in an instance repository, and each subsequent instance identified during the data ingestion step of deduplication is simply referenced to the one saved copy, e.g., with a key-value pair in an index file of a database or with information of an in-memory index. In this example, data deduplication reduces storage requirements from one thousand megabytes to about one megabyte.

In-line deduplication is often utilized and is the process where the deduplication hash calculations or signatures are created on a target device as the data enters the device in real time. First such a system chunks the data into manageable blocks using any well known method. If the device finds a block or chunk that already is stored on the system, it does not store the new block but instead just references to the existing or previously stored block or data chunk. A benefit of in-line deduplication over post-process deduplication is that it requires less storage as duplicate data is never stored. However, fast in-line deduplication may be limited by the time required for hash calculations and lookups to disk or other slower-access devices, which can slow data ingestion. It may be argued that it is more important to make the in-line data rate as fast as possible, even at the expense of deduplication efficiency in some cases. One reason to do this is the elimination of disk or storage resources needed to hold the data until it can be deduplicated. Hence, there is a need to limit any reductions to the in-line data rate caused by accesses to disk (or lookups to a large lookup dictionary stored on disk, flash, or other storage) to determine whether the data's hash or signature is a duplicate.

SUMMARY

Briefly, a data deduplication dictionary system and method are presented in the following description that provide for faster in-line deduplication. The system and method speed up the in-line data rate by minimizing or eliminating disk lookups to a large total chunk hash repository (or "large dictionary") by providing a hash digest dictionary (or "small dictionary") in a fast storage medium (e.g., main memory, fast volatile memory, and/or non-volatile fast storage). The hash digest dictionary is kept small enough (e.g., 32 gigabytes (GB), 64 GB, or the like to suit a practical memory size) so that the dictionary or index of hashes (or signatures) can be economically stored in memory to eliminate at least a portion of the disk lookups. Briefly, this is achieved by providing an in-line deduplication system and method that includes a small dictionary generation mechanism (or repeating hash or signature identifier) that identifies the most repeating hash values, digests, signatures, or the like (e.g., the hash values for chunks of data that keep showing up over and over again in the incoming or input data). The in-line deduplication system functions to store these most repeating hash values in the small dictionary while discarding the hash values from the small dictionary that are determined by the small dictionary generation mechanism to not repeat as much. Also, the small dictionary may be generated or modified on an ongoing basis to keep only the most repeating signatures (e.g., hash values or the like) by processing the total hash storage dictionary in the background and updating the small dictionary as needed.

More particularly, a data deduplication method is provided that utilizes a small dictionary or hash digest dictionary accessible in main memory as well as a large dictionary (or large total chunk hash repository on disk or other non-volatile data storage). The method includes using a data deduplication system (e.g., a computer system/device with processors running software or program code devices to perform functions) to receive a set of input data for deduplication (e.g., customer's data from one or more various sources). The method includes separating the input data into smaller chunks of data and then generating or assigning a unique signature to each of the data chunks (e.g., a cryptographic hash function may be used to calculate hash values or digests for each chunk). The method also includes using a lookup mechanism to perform a lookup for each of the data chunks based on their unique signature in a small dictionary that is stored or accessible in main memory or another fast storage medium (e.g., fast volatile or non-volatile memory or storage) accessible/useable by one or more processors. The method also includes a storage mechanism for adding data chunks to the large dictionary.

Significantly, an exemplary but not limiting goal of the small dictionary is to include or capture a set of entries that correspond to the most repeating ones of the data chunks in the set of input data (e.g., most repeating hash values or signatures). The building of the small dictionary may be performed on-the-fly without prior knowledge of the input data. To this end, the building step or function may include processing the data chunks in the order they are received to determine whether a value exists for an entry corresponding to their signature in the small dictionary and when no value is found at an entry, the signature may be retained/added to the small dictionary for the corresponding data chunk. Hence, the small dictionary is built based on the concept that statistically the most repeating data chunks should be received early or first and most frequently within the input data. The entries of the small dictionary may be organized by indexes that are determined based on well known computer science constructs to look up values using probabilistic methods. The index of the chunk signatures may be generated in this manner, such as by transformation (e.g., a hash algorithm) of the signature for a data chunk.

Over time, the small dictionary is filled up with signature entries such that later received data chunks result in signature collisions (values/data at the entries in the small dictionary that are identified by the data chunk signature's index). When a signature is found at an entry location, a determination is made of whether the entry's signature matches the signature of the currently being processed data chunk. If a match is found, the count for the entry is increased and if a match is not found, a new or next entry location may be determined (e.g., repeat the hash value transformation) and the small dictionary accessed again for the data chunk signature comparison. This process is repeated until a free location is found for the new signature. If after repeating this process for a predetermined number of times (e.g., 2 to 24 or more times) a free location is not found, a replacement algorithm is initiated. The replacement algorithm may include comparing the existing entries count value against a predefined threshold value (e.g., 3 to 5 or the like), and when lower or matching, then replacing the existing entry in the small dictionary with the new/current data chunk and its signature (e.g., this new hash value is determined or presumed to be a more likely repeating hash value—at least for this point in time).

As can be seen, the method involves retaining the most repeating hash values (or entries for corresponding data chunks) in a small dictionary that is quickly accessible during in-line data deduplication. In addition to this in-line building, the small dictionary may be optimized (or updated) based on actual repeating chunk information obtained from the large dictionary. During deduplication, the large dictionary is built and maintained so as to include entries for each data chunk within the incoming data and to include occurrence/usage data (e.g., which entries or data chunks occur most often in the data set). A background process may act to periodically sort the large dictionary based on occurrence counts, for example, and a set of the entries corresponding to most repeating data chunks (and/or signatures of such chunks) may be used to optimize the small dictionary. This may involve replacing some or all entries of the small dictionary with this new set.

DETAILED DESCRIPTION OF EXEMPLARY EMBODIMENTS

Figure 1:
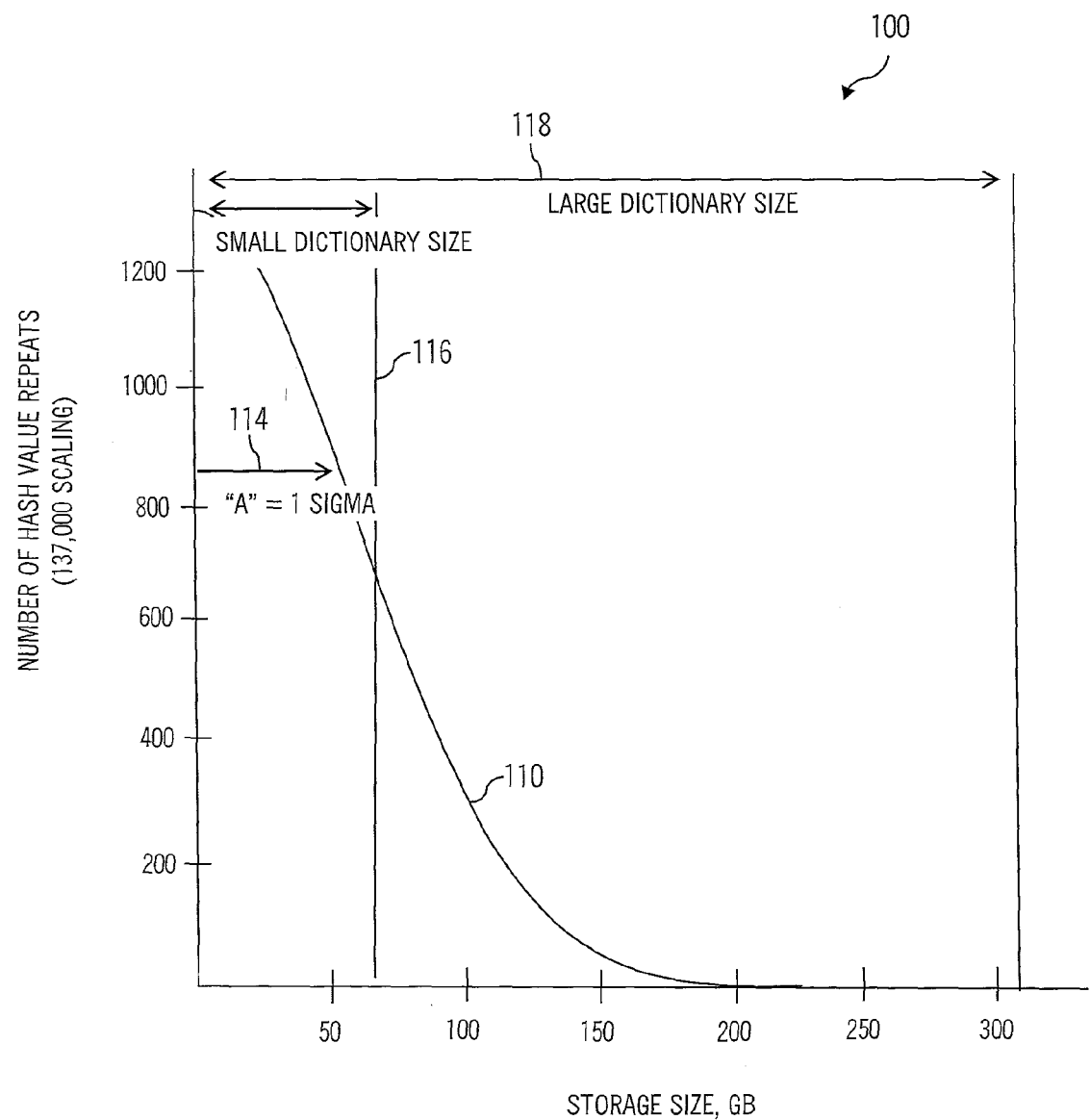
FIG. 1 illustrates a graph of a hash normal distribution function illustrating use of small dictionary versus a large dictionary.

Briefly, an in-line data deduplication system and method are provided that limit or even eliminate accesses or lookups to data stored in a repository. This is achieved by providing a dictionary that contains the signatures of the most repeating data chunks (or a small dictionary) in main/local memory such that the in-line deduplication method may perform lookups to the local memory of cached hash values in the small dictionary. This is achieved by providing a hash digest dictionary (or small dictionary) in the main/local memory such that the in-line deduplication method may first perform lookups to the local memory of cached hash values in the small dictionary and may second, if a duplicate digest/hash value is not found, add the digest/hash value to the large dictionary. Adding a digest/hash value to the large dictionary may result in unnecessary disk access if the digest/hash is in fact already present in the large dictionary but is not present in the small dictionary.

The following description begins with a general explanation of the usefulness of a small dictionary in main memory that is used to store the most repeating hash values or digests in the incoming or input data stream (i.e., hashes or signatures for most often found data chunks in the data being deduplicated). The description then proceeds to description of an in-line deduplication system for implementing the in-line deduplication method along with exemplary techniques for performing in-line deduplication, for building/updating (i.e., generating) the small dictionary (or hash digest dictionary) with explanation of how it is determined which values are retained in this cache, and for periodically processing the large dictionary to modify the small dictionary to more accurately reflect most repeating hash values (e.g., replace "best estimates/determinations" with verified repeating values).

The inventors were attempting to provide faster in-line deduplication with the understanding that one existing bottleneck is the dictionary lookup (i.e., the lookup of a hash value or digest in a large dictionary). It was determined that to increase the in-line data rate it would be desirable to provide a small dictionary or small hash digest dictionary in a fast storage medium such as, but not limited to, main memory. A problem, though, that had to be overcome was the desire to provide or represent the large dictionary (or the data it provides) in a much smaller memory space. For example, the large dictionary may be quite large, e.g., up to 250 GB or more, while the space available for a cache of hash values in a fast storage medium such as main memory may be much smaller such as 32 to 64 GB or the like. The inventors determined that all hash values could not be stored in the small dictionary so they needed to provide mechanisms or techniques for providing more comparisons than was possible while using a more reasonable amount of main memory to store the digests or hash values (or other signatures) of duplicate data chunks (e.g., of data already stored in disk or non-volatile memory). The problem was then to determine which signatures should be stored in the small dictionary.

The inventors determined that the small dictionary would be useful in providing a faster in-line deduplication method if the hash values associated with the most repeating data chunks (or most repeating hashes) were stored in the small dictionary. Additionally, in creating the small dictionary (e.g., with a small dictionary generation mechanism), it was observed that statistically because the most repeating data chunks or their hashes/signatures occur most frequently in the incoming data, instances of these most repeating data chunks will occur early in the incoming data. These observations are used by the in-line data deduplication method and system described herein to allow a small dictionary to be created on-the-fly and without prior knowledge of the incoming data in an effective manner. The small dictionary can then be updated periodically to accurately reflect a background processing of the large dictionary that determines the most accurate actual set of most repeating digests or hash values for a particular data set at a particular point in time. Then, on an ongoing basis, the updated small dictionary can be modified based on data chunks in the incoming data stream to reflect the current set of most repeated hash values. In this way, an ongoing process may be used to generate and update the small dictionary based on processing of received data chunks while a background process can periodically be used to enhance the accuracy of the set of most repeating hash values (e.g., a calculated set of repeating hash values may be updated to reflect those hash values that actually are the most repeating in the large dictionary).

An ideal model was developed to represent data deduplication efficiency versus the distribution of repeating hash values. The ideal model represents the best or perfect system efficiency. In a test system that uses generated or calculated input data for a deduplication system, the ideal may be calculated with a mathematical formula. In contrast, in a test system that uses real world data, the ideal is derived by processing all the sample data to evaluate which data objects or chunks would be ideal to have stored in a small dictionary. Once the ideal system efficiency is known or set by such techniques, an actual system or prototype may be compared with the ideal model.

FIG. 1 illustrates a graph 100 showing a normal distribution of repeating hash values used in one example of a data deduplication process. In the graph 100, the repeating hash values are shown under the line 110 with a normal distribution with a standard deviation shown at 114 (e.g., "a" of 1 sigma). The number of hash value repeats for this data set is shown on the Y-axis of graph 100 while storage or memory size used to store the repeating values is shown along the X-axis (e.g., gigabyte (GB) of memory). As shown, the graph 100 shows the distribution of repeating hash values used in one example by the inventors, and this is a normal distribution with a 1 sigma as shown at 114. The repeating hash values under curve/line 110 are ordered so that the most repeating hash values (best values for inclusion in a small dictionary) start at the left on the X-axis. The Y-axis represents the number of times the hash values repeat in representing the data, which is the number on the Y-axis times 137,000 scaling in this example.

One way to understand the information presented by graph 100 with regard to enhancing data deduplication is that the integral under the curve 110 is the total number of times the unique hash values stored in memory on the X-axis that are used to represent the data (e.g., customer data from various sources or the like). If a small dictionary size (shown at 116) of 64 GB is chosen, the integral under the curve 110 from 0 to 64 GB represents about 70 percent of all of the total number of times all the hash values are used to represent the data. The 70 percent for the small dictionary may be referred to as its "capture efficiency" for a set of processed data. The model assumes the distribution shown in graph 100 and calculates the capture efficiency for various examples (e.g., differing input data sets, as discussed below). The capture efficiency that the model or program calculates is the best case since it assumes all the most repeating hash values that can fit get placed into the small dictionary at the beginning of the deduplication process (or beginning of a build of a small dictionary).

Figure 2:
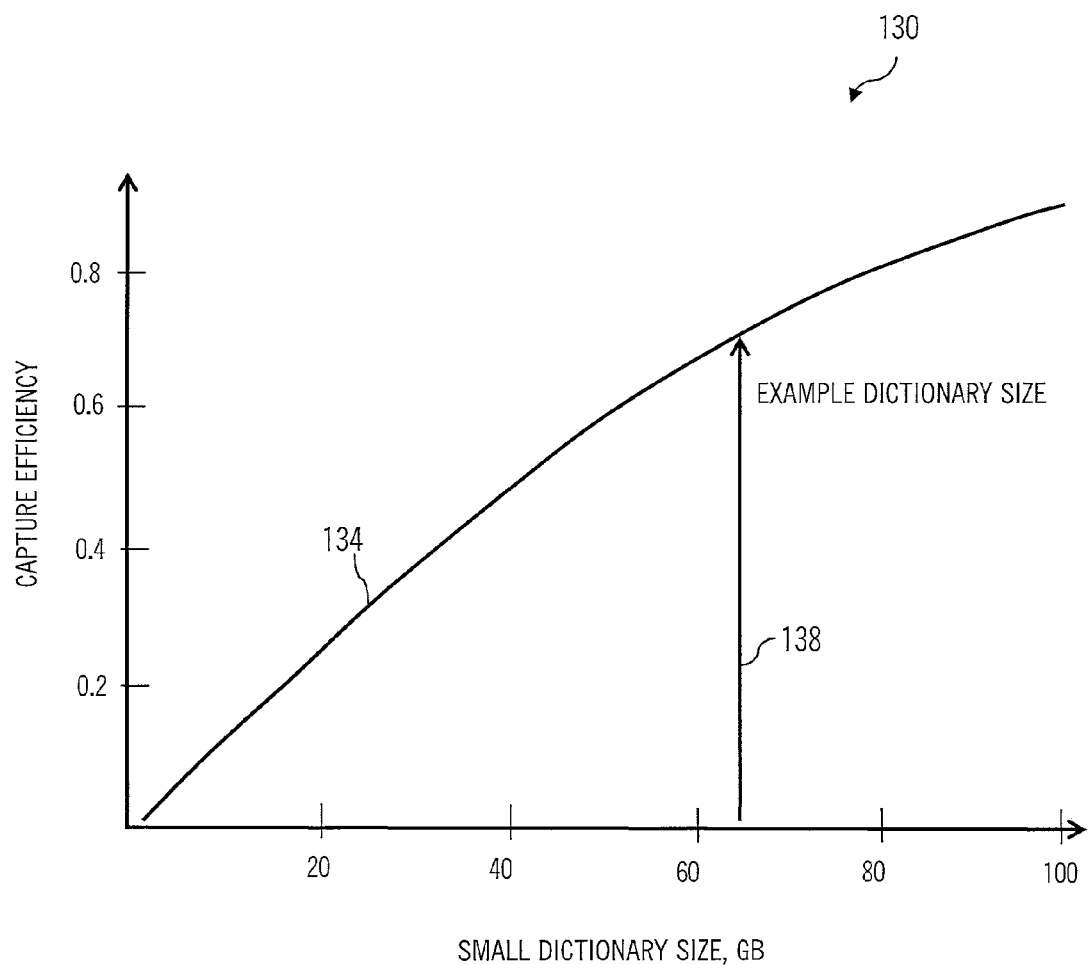
FIG. 2 illustrates a typical model result for input data showing capture efficiency versus small dictionary sizes.

FIG. 2 illustrates a graph 130 showing a typical output for the above described model for an input data stream. Graph 130 shows a curve 134 indicating capture efficiency versus sizes of the small dictionary, with line 138 showing one exemplary small dictionary size (e.g., the size 116 shown in FIG. 1). In FIG. 2, the standard deviation of the repeating hash values is 61 GB and the data pool size was 2 PB. The deduplication ratio was chosen to be 20:1 while the hash reduction ratio was set at 341:1 for this modeling. In the graph 130, the capture efficiency is shown on the Y-axis as a function of the small dictionary size varying, in this non-limiting example, from 0 to 100 GB. A capture efficiency value of 1.0 is the best capture efficiency possible meaning that 100 percent or all of the unique hash values representing the input set of data are in the small dictionary. The example at 138 is of a small dictionary size of 64 GB, which is also the example size used in FIG. 1. As shown, the capture efficiency of the small dictionary increases as the size or amount of memory dedicated to this dictionary increases and the best (or most repeating) hash values are better captured. However, nearly any practical size small dictionary is relatively effective at retaining repeating hash values (e.g., relatively small dictionaries have efficiencies of 40 to 50 percent or higher with the exemplary size of 64 GB having a useful capture efficiency of nearly 70 percent).

Figure 3:
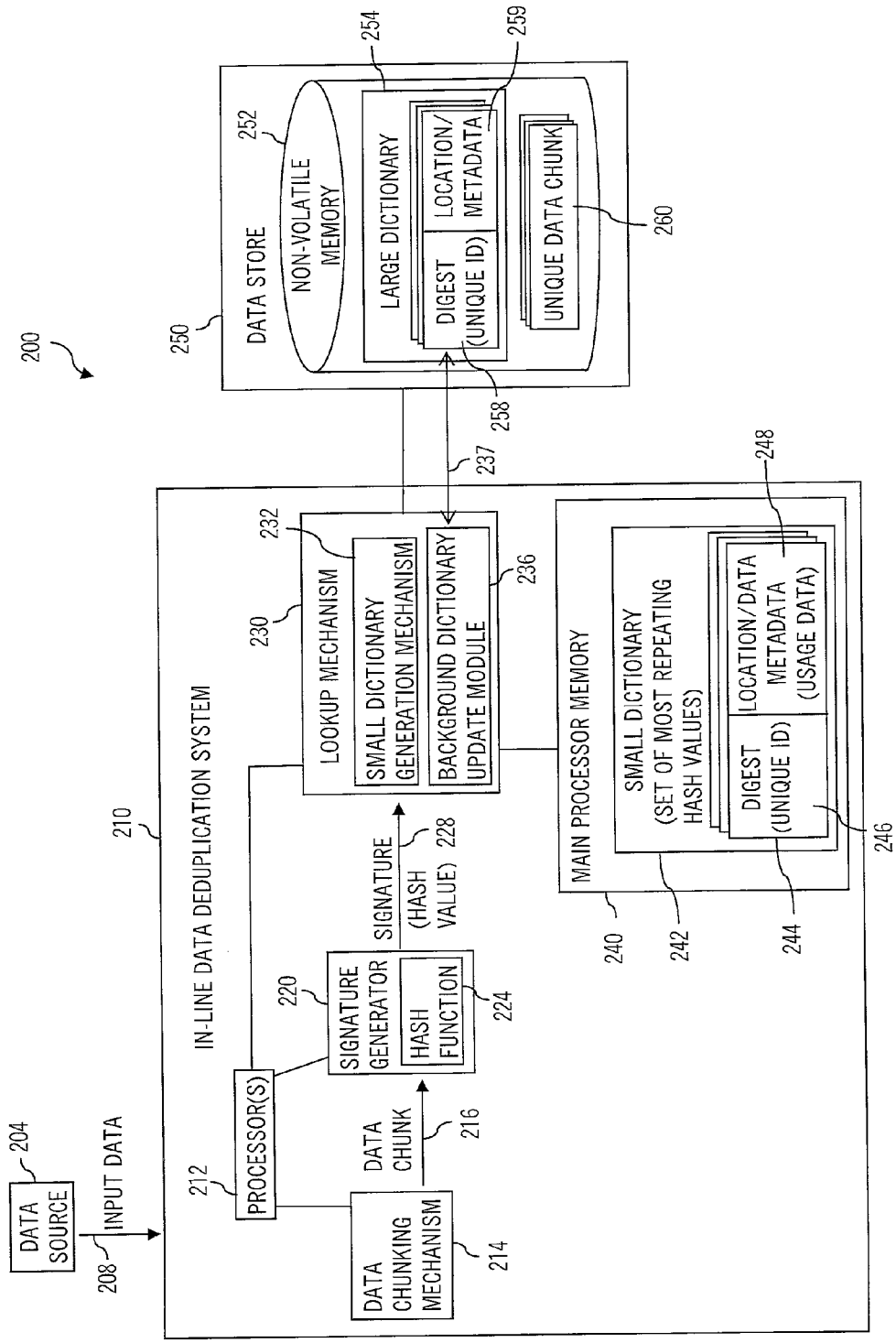
FIG. 3 illustrates a block diagram of a computer system or network using a data deduplication system to implement a small and large dictionary-based in-line deduplication process.

FIG. 3 illustrates one embodiment of a computer system or network 200 (such as an enterprise computer system, a data backup system, or the like) in which the in-line data deduplication techniques taught herein may be practiced. The system 200 includes a data source 204 such as a customer's computer system for which it is desired to provide data backup or the like with in-line data deduplication. The source 204 provides input or incoming data 208 (e.g., a data pool) to an in-line data deduplication system 210. The deduplication system 210 may take many forms to practice the invention and generally may be any combination of computer devices/systems typically including one or more processors that run code or software modules to perform deduplication functions and that utilize a fast storage medium such as main memory for caching a small dictionary (as described herein) to provide faster in-line data rates.

As shown, the in-line data deduplication system 210 includes a main processor(s) or CPU 212 that manages memory 240 (fast storage medium) and that uses one or more software modules to process the incoming customer data 208 to determine which is duplicate data that should only be referenced in a reduced data store and which is unique and should be stored in the reduced data store (along with a corresponding update to digest/hash value records or entries in the small or large dictionary). To this end, the incoming data 208 is first processed by a data chunking mechanism 214 (e.g., a Rabin chunker or the like) that operates to separate the incoming data (e.g., a file, an e-mail message, a block of data, or the like) into smaller chunks of data. This may be done by separating the larger incoming data set by blocks, by files, using context-based data chunking techniques, or other methods for smaller chunks or blocks of data. For example, the methods of separating data into chunks or segments described in U.S. Pat. Nos. 5,990,810 and 6,928,526, which are incorporated herein in their entirety by reference, may be used to configure the chunking mechanism 214.

The data chunking mechanism 214 provides the data chunks 216 to a signature generator 220 run by the processor 212 to provide signatures 228. The generator 220 may be used to provide a unique signature or fingerprint for the data chunks 216 in a number of ways to practice the invention. In many deduplication systems as shown for system 210, a cryptographic hash function or the like 224 is used by the generator 220 to produce the signature 228 in the form of a hash value or digest. A cryptographic hash function 224 may be used to provide a deterministic procedure or algorithm that takes an arbitrary block of data 216 and returns or outputs a fixed-size bit string (i.e., the hash value or digest providing a signature 228 for a data chunk or object). The hash function 224 may be varied to practice the system 210 with one embodiment utilizing the SHA-1 cryptographic hash function in the ID generator 220, but, of course, other hash functions such as the SHA-2 256 or SHA-2 512 developed by the NSA or others may be used to produce the signature 228 (e.g., a short, unique identifier for each segment or smaller portion of the input customer data 208).

The processor 212 further runs a lookup mechanism 230 that generally functions according to this description to generate a small dictionary or hash digest dictionary 242 in main memory 240 during in-line data deduplication of data 208. This may be performed by the small dictionary generation mechanism 232 without prior knowledge of the data 208. Also, the lookup mechanism 230 acts to receive a signature 228 and to respond by first performing a lookup to the small dictionary 242 (e.g., by creating an index from the signature 228 for use in accessing the dictionary 242). If the data chunk is represented in the small dictionary 242, the data chunk 216 corresponding to the signature 228 has the data chunk replaced with a reference or link (e.g., found in the location/metadata portion 248 of record 244 of dictionary 242) to the previously stored unique data chunk 260 in a data store 250 with non-volatile memory 252 (e.g., in reduced data storage in disk, flash, or a similar data storage device(s)).

If the signature 228 is not found in the small dictionary 242 based on a comparison with a digest/hash value 246 portion of the records 244 for the most repeating hash values (or data chunks from stream 208) and speed can be sacrificed to obtain more deduplication (e.g., as another potentially useful implementation), the lookup mechanism 230 acts to perform a lookup to a large dictionary or large total chunk hash repository 254 and its records providing unique hash values 258 and location/metadata (such as a complete data history) 259 for the unique data chunks 260. If a digest match is found, the chunk 216 is replaced with a reference to location (from location metadata 259) for the unique data chunk 260. If the digest match is not found, in some implementations, the chunk 216 is added to the large dictionary of large chunk hash repository 254 and to the location metadata 259 (e.g., a new chunk is added to the large dictionary and the actual chunk is stored).

However, the small dictionary generation mechanism 232 may be used to determine whether the signature 228 should be added to the small dictionary 242. The addition may involve addition of a record 244 with the digest field 246 filled with the signature 228 and a location and/or other metadata 248 being added such as during initial build of the small dictionary 242. This may be the case where the small dictionary generation mechanism 232 is adapted to assume that the most repeating hash values are the earliest to arrive in data 208. Once the small dictionary 242 is full (i.e., has a predefined number of records 244 representing or corresponding to a like number of repeating hash values or data chunks of data in pool 208), the addition of the signature 228 may involve the signature 228 used to replace an existing small dictionary entry 244. Note, the small dictionary 242 will not necessarily be full when a value needs to be replaced (e.g., "full" meaning that every entry is taken). Since any particular hash value has only one (or, at most, a few) possible locations in the small dictionary 242, a new hash may find all its possible locations already have occupants even though there are empty locations in the small dictionary 242. Hence, the above use of "full" may instead be thought of as "containing some entries."

Note, the lookup mechanism 230 typically also functions (as shown at 237) to place a copy of digests 246 added to the small dictionary 242 in the large directory 254 such that the large dictionary 254 provides a complete history of the deduplication of data 208. Also, the metadata 259 of a record for a digest 258 found in the small dictionary 242 is updated to indicate that a lookup by mechanism 230 found the item in the small dictionary 242. This allows the large dictionary 254 to provide a complete history of the data 208 such that it may be processed to generate an optimum hash selection for the small dictionary 242 with the update module 236 (e.g., determining a set of digests 258 that have largest counts of lookup hits in their metadata 259 because the lookup mechanism 230 acts to increment a count provided in the metadata 259 each time a received data chunk 216 has a matching digest 228 with digest ID 258).

The lookup mechanism 230 may further use a background dictionary update module 236 to periodically process (as shown at 237) the large dictionary 254 to determine which of the digests 258 are actually the most repeating based on analysis of the metadata 259. Then, these results may be used to modify the small dictionary 242 such that it includes a more accurate representation of the most repeating hash values for the data 208 (e.g., replace records 244 based on actual knowledge of data 208 rather than the results provided by the generation mechanism 232 and its algorithms).

From FIG. 3, it can be seen that the small dictionary (or hash digest or signature dictionary) 242 may be used by the lookup mechanism 230 for fast, in-line lookups of hash values 228. The system 200 also makes available a large total chunk hash repository 254 on disk or similar non-volatile storage 252. The large repository 254 stores the complete history for processed data 208 and can be used (as shown at 237) by the background dictionary update module 236 to generate an optimum hash selection for the small dictionary 242 in background operation of the system 200. The optimum hashes may be sorted in memory 252 and then used by update module 236 to periodically update the hashes 244 in the small in-line dictionary 242 to give the most optimum selection (e.g., periodically update dictionary 242 such that it reflects actual gathered data for the input data 208 such as counts of various chunks 216 or the chunk hash values 228 representing most repeating hash values).

One of the important components of the deduplication system 210 is the small dictionary generation mechanism (or hash digest dictionary algorithm) 232. This may be thought of as software used by processor 212 to implement a cache 242 where the most frequently encountered hash digest values are stored in computer main memory 240 for fast access. Typically, the dictionary 242 is arranged such that any of the digest values 246 may be rapidly accessed in any or random order.

Figure 4:
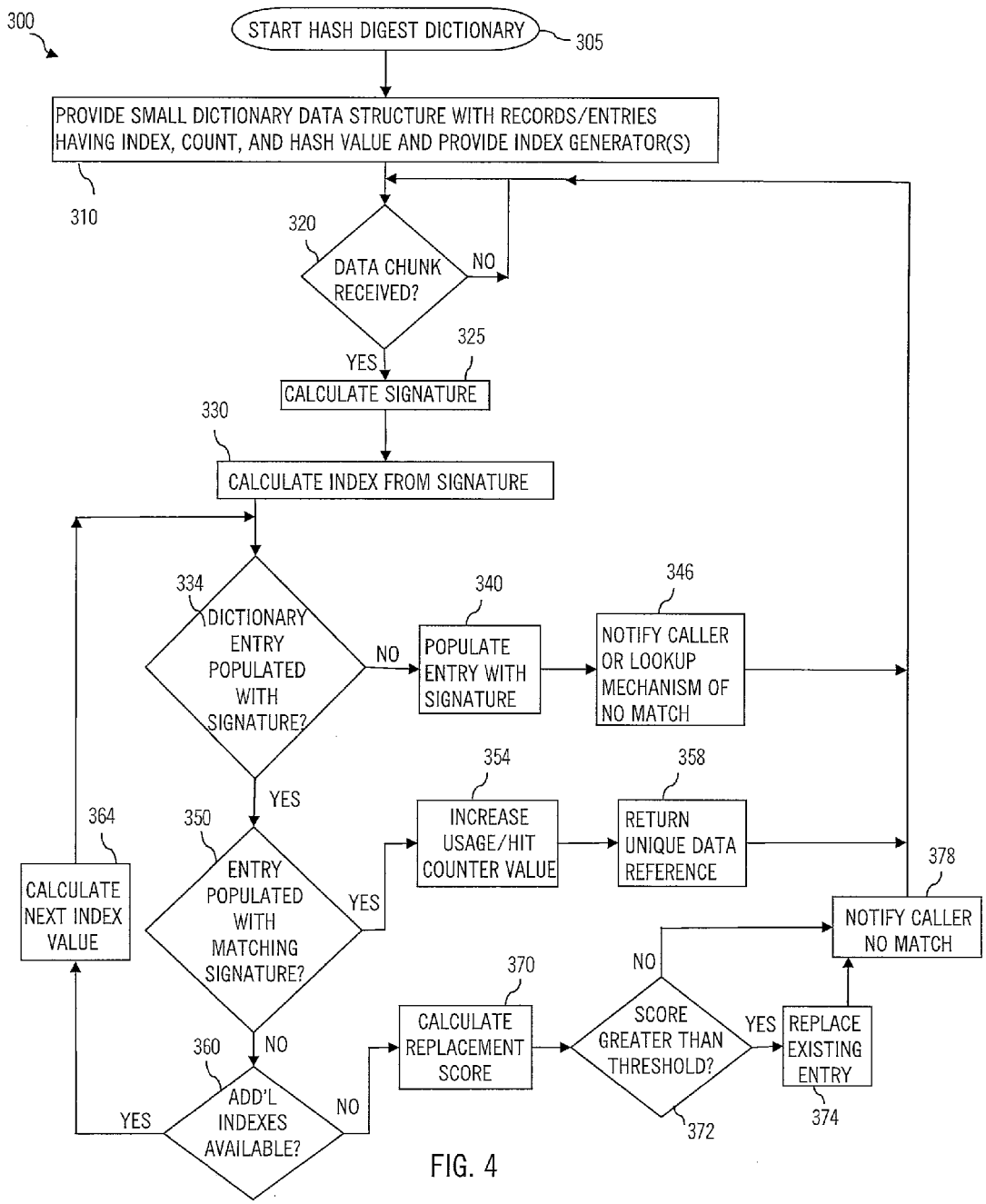
FIG. 4 is a flow diagram of process of building and maintaining/updating a small dictionary for use in an in-line data deduplication process such as would be performed by the system of FIG. 2.

FIG. 4 illustrates an exemplary method 300 of building or generating a small dictionary (such as via operation of mechanism 232 to build and maintain the dictionary 242 in main memory 240). The method 300 starts at 305 such as with providing a small dictionary generation mechanism 232 as part of or callable by the lookup mechanism 230 in an in-line data deduplication system 210. This step 305 may also include defining a set of mechanisms for defining one, two, three, or more indexes for a particular hash value (e.g., some predefined number of indexes may be calculated for a hash value or digest as part of the small dictionary generation process 300) or such index generators may be provided in step 310. Step 305 may also involve defining a replacement algorithm for use in step 370 and any parameters needed for such an algorithm (e.g., a simple comparison of a count value for a hash value to a threshold may be used to determine when it should be replaced by a newly received hash value and step 305 may involve defining a threshold value (e.g., 3, 4, 5, or more may be used as this threshold count for defining most repeating in the small dictionary)).

The method 300 continues at 310 with defining and/or providing the data structure for the small dictionary 242 in the main processor memory 240, and this may involve providing a predefined number of records or entries 244 in a table or database and may involve defining fields for each record or entry such as an index, a count value, and a hash value (or digest). At 320, the method 300 includes waiting for a next data chunk 216 from a data stream or pool 208.

When a data chunk is received in an in-line data deduplication method, the method 300 continues at 325 with calculating or generating a signature (such as a hash value) for the data chunk. At 330, the method 300 continues with initiating a lookup to the small dictionary by calculating an index from the signature created in step 325. This may include calculating a first index value for the received hash value or digest. In some cases, a hash value transformer such as another hash algorithm may be used to generate an index from the hash value (e.g., to transform the 20-byte hash value into a 20 bit index value or the like). In other words, steps 320, 325, 330, and 334 involve the deduplication system asking the small dictionary if a particular digest is cached yet in the small dictionary (and also asking for usage data if it is present in the small dictionary). The small dictionary generation mechanism 232 may calculate an index at 330 based on the value of the hash (e.g., the SHA1 digest or the like). For example, the first index may be calculated by the generation of an 8-bit checksum by adding the 20 bytes of the digest, and the 8-bit checksum may be used as the index for the hash value of the data chunk into a 256-entry cache or small dictionary.

At 334, the small dictionary generation mechanism 232 determines if the dictionary entry associated with the index is populated or cached with a signature. If there is no signature at the entry associated with the calculated index, then the entry is populated with the signature associated with this data chunk at step 340 (e.g., if the count is zero for an index, the index is incremented to 1 and the hash value or digest is written into the small dictionary along with other information such as reference data for the data chunk useful for locating the stored unique data chunk in data store 250 or the like). At 346, the caller or lookup mechanism 230 may be signaled that no match was found in the small dictionary. In step 346, the lookup mechanism 230 may access a data store 250 to place or populate a record or entry for the data chunk in the large dictionary 254 and store the unique data chunk 260 in the non-volatile memory 252 (or in reduced data store for the system 200). As noted earlier, it is assumed that most repeating hashes will be received early within a customer's data pool or a data stream, and, hence, hash values are populated into the small dictionary in step 340 each time a hash value is received for which the entry at the corresponding index value is not yet populated with a signature. Over time, though, the table or cache will fill up and indexes may begin to collide.

When a dictionary entry at the index value is found to be populated with a signature at 334, the method 300 continues at 350 with a determination of whether the entry is populated with a matching signature (e.g., the SHA1 digest compare succeeds). If yes, the method 300 continues at 354 with increasing the usage/hit counter value (or otherwise updating the entry usage statistics), and, then at 358, the entry information for the hash value is returned to the caller/lookup mechanism 230 from the small dictionary 242 such as the location and/or chunk metadata 248 associated with the digest 246.

However, if the digest or signature of the received data chunk does not match a signature at the entry associated with the first index at 350, the method 300 continues at 360 with a determination of whether there are additional indexes available (or transformation mechanisms) remaining. If so, at 364, a second, third, fourth, or some preset number of indexes is calculated for the received data chunk, e.g., by using a differing transformer algorithm or module to process the hash value for the data chunk to provide a different index value. Then step 334 is repeated for the new index until an entry is found that has not yet been populated with a signature, has been populated with a matching digest or signature, or a non-matching signature is found and the process is at a final or last-available index value at 360 (i.e., no additional indexes available).

When this occurs (i.e., no match after all index transformations have been performed for a hash value), the method 300 continues at 370 with initiating the performance of replacement algorithm or a determination of whether the new entry should be used as a replacement for the present entry 244 of the small dictionary 242 at the corresponding calculated index. This may involve at 370 calculating a replacement score and then at 372 determining whether the score is greater than a threshold value (such as, but not limited to, 2, 3, 4 or even up to 20 or more). If the threshold is exceeded by the replacement score, the existing entry or signature is replaced at 374 by the signature corresponding to the presently processed data chunk. If not, at 378, the caller or lookup mechanism 230 is notified that no match was found, and this may result in a lookup being performed to the large dictionary 254 to retrieve location data for the data chunk (or result in populating a new entry 256 in the large dictionary 254 for the non-most repeating hash value associated with the data chunk).

As will be appreciated from the above description, the data deduplication dictionary method and system addresses the bottleneck caused by lookups to disk. To this end, the method provides a small dictionary of most repeating hashes that allows fast lookups that in many cases will provide matches for many processed data chunks (readily identified repeating data chunks). The small dictionary is built by sticking hash values of the data chunks that are determined to be the most frequently repeating in a given data pool (but using an algorithm that does not require full knowledge of the pool so as to allow in-line processing of the pool and concurrent generation of the small dictionary). A large dictionary is also maintained that includes all the history of the deduplication process and entries for all unique data chunks in the data pool along with counts or other metadata that can be used to sort the data entries to identify periodically that actually most repeating hashes. This determination is then used to provide an optimization of the small dictionary by replacing (as needed) the existing entries in this cache.

As discussed above, the small dictionary is useful for providing a small memory footprint cache that holds the most suitable or productive hash values. It may implement a constant time probabilistic lookup mechanism to index values in the cache. The small dictionary generation mechanism may use a signature/hash replacement algorithm or mechanism (e.g., a software code device) that acts to predict the most productive hash values for inclusion or retention in the small dictionary. For example, the replacement algorithm may use a combination of collision counts, recently used, and the current productivity to predict long term productivity of hash values for a data set or pool. The big or large dictionary holds all possible unique hash values and their associated statistics. The large dictionary and its associated algorithms have access to historical information, and the large dictionary may be used to tweak or feedback the small dictionary (as shown with background dictionary update module 236 at arrow 237 in FIG. 3).

Several dictionary replacement algorithms (or modules implementing such techniques) may be used by the small dictionary generation mechanism. For example, a sticky replacement technique may be used in some embodiments while other embodiments may use a least recently used algorithm or some combination these may be used. In a sticky algorithm, the inter arrival rate of desirable entries may be higher than the general population of hash values or signatures. Desirable entries "stick" early in the life of the small dictionary. A threshold value of 2, 4, 6, 20, and so on may be set. Then, the sticky algorithm would involve tracking collision frequency of each entry in the small dictionary. A collision is said to occur when the index of the dictionary maps an unrelated value to the same location of the current entry. Then, the sticky algorithm may continue with tracking usage frequency of each entry in the small dictionary. A usage is said to have occurred when the index of the dictionary maps the same value to the location of the current entry. If the ratio of the collision frequency and usage frequency is greater than the set threshold, the stick algorithm-based mechanism acts to replace the present signature with the new signature.

In other embodiments, the replacement mechanism may be at least partially based on a least recently used (LRU) algorithm. LRU algorithms are useful for addressing radical change in symbol (or data blocks) as data matures (e.g., as processing of a data pool proceeds). Newer symbols or signatures may not make it (or be chosen for populating a small dictionary) because of established entries. Hence, it may be useful to leave an entry in the small dictionary "for a while" before replacing it. An LRU-based technique may ignore collision frequency and, instead, use usage frequency. An entry may age before indicating it should be replaced such as with most recently used entries (or signatures at indexed entries) staying in the small dictionary while least recently used entries are ejected from the small dictionary. In some cases, it may even be useful to apply a never replace technique in which established entries stay in the small dictionary or an always replace technique in which newer entries always replace the established entries (but, likely, a less desirable replacement technique).

The following table provides results or details of analysis of several test cases (e.g., differing sets of input data) that were run using differing replacement algorithms on a random arriving set of hash values having a normal distribution of repeating values. The table shows model or ideal efficiencies for the various cases as well as the efficiencies achieved for differing replacement techniques or algorithms. For example, a test case "4" had a model efficiency of 30.4 percent, and a sticky replacement algorithm was able to achieve capture efficiencies of 25.3, 25.8, and 22.2 percent, respectively, for thresholds of 2, 4, and 20, respectively. For this same data set, an LRU always replace technique had very low efficiency while LRU never replace actually achieved 21.12 percent capture efficiency. As can be seen by this test data, the use of a small dictionary may provide a significant advantage with nearly any replacement technique being used for determining which signatures or hash values are retained in the small dictionary for a data set. Some techniques may be more desirable but each provides some improvement over systems that do not include such a local cache of most repeating hashes or signatures.

| TABLE OF CAPTURE EFFICIENCIES FOR REPLACEMENT ALGORITHMS | | | | | | | | | |
|---|---|---|---|---|---|---|---|---|---|
| Case | Model Eff | Sticky = 2 Proto Eff1 | Sticky = 4 Proto Eff2 | Sticky = 20 Proto Eff3 | LRU always replace | LRU never replace | Ratio of short dictionary to total dictionary % | #STD div in total dictionary | #STD div in the small dictionary |
| 6 | 13 | 10.9 | 10.2 | 10.5 | 0.43 | 9.77 | 7.81 | 2 | 0.1562 |
| 7 | 15.5 | 11.5 | 12.3 | 12.2 | 0.11 | 10.74 | 1.95 | 10 | 0.195 |
| 3 | 26.2 | 21.6 | 20.8 | 19.5 | 0.98 | 19.17 | 15.94 | 2 | 0.3188 |

-continued

TABLE OF CAPTURE EFFICIENCIES FOR REPLACEMENT ALGORITHMS

| Case | Model Eff | Sticky = 2 Proto Eff1 | Sticky = 4 Proto Eff2 | Sticky = 20 Proto Eff3 | LRU always replace | LRU never replace | Ratio of short dictionary to total dictionary % | #STD div in total dictionary | #STD div in the small dictionary |
|---|---|---|---|---|---|---|---|---|---|
| 8 | 30.3 | 25.8 | 26.1 | 22.2 | 0.13 | 20.87 | 1.95 | 20 | 0.39 |
| 4 | 30.4 | 25.3 | 25.8 | 22.2 | 0.51 | 21.12 | 7.81 | 5 | 0.3905 |
| 9 | 48.4 | 40 | 40 | 35.2 | 0.17 | 33.68 | 1.95 | 33.3 | 0.64935 |
| 5 | 56.5 | 47.7 | 48.2 | 42 | 0.83 | 40.74 | 7.81 | 10 | 0.781 |
| 1 | 57.5 | 47.8 | 47.8 | 41.9 | 0.02 | 40.98 | 15.94 | 5 | 0.797 |
| 2 | 88.9 | 87.6 | 85.8 | 77.9 | 11.23 | 76.55 | 15.94 | 10 | 1.594 |

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the in-line data deduplication in system 210 such as the data chunking mechanism 214, the signature generator 220, the lookup mechanism 230 with its small dictionary generation mechanism 232 and dictionary update module 236, and the like may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The computer systems used to provide a data reduction or deduplication service using a small and large dictionary encompass all apparatus, devices, and machines for processing data, including by way of example a programmable processor, a computer, or multiple processors or computers. The system (such as system 200 of FIG. 3) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide small dictionary generation and maintenance functions and the like) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

For example, FIG. 3 is a block diagram illustrating one embodiment of a computer system 200 configured to implement the methods described herein. In different embodiments, computer system 200 may be or include any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device. The data input 208 may be provided from one or more devices over a wired and/or wireless connection and/or digital communications network. Likewise, the data store 250 may be linked by wired or wireless connections and/or replaced by one or more devices accessible by a digital communications network (e.g., the unique data chunks 260 may be stored in one or more locations and the large dictionary 254 may be stored or accessible via a number of communication links and/or devices).

Typically, a computer will also include, or be operatively coupled to receive data from or transfer data to, or both, one or more mass storage devices for storing data, e.g., magnetic, magneto-optical disks, flash or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

We claim:

1. A data deduplication method, comprising:
with a data deduplication system, receiving a set of input data for deduplication;
separating the input data into a number of chunks of data;
with a signature generator, assigning a signature to each of the data chunks;
with a lookup mechanism, performing a lookup for each of the data chunks based on the corresponding one of the signatures in a stored small dictionary, wherein the small dictionary includes a number of entries corresponding to most repeating ones of the signatures associated with the set of input data, wherein the signature generator comprises a cryptographic hash function, and wherein the signature for each of the data chunks comprises a hash value; and
building the small dictionary including determining whether the small dictionary includes an entry for the hash value for each of the data chunks in a receipt order of the input data.

2. The method of claim 1, further comprising for each unique one of the data chunks in the input data, providing an entry in a large dictionary with each of the entries storing the signature for the unique one of the data chunks and usage data including occurrences of the unique one of the data chunks in the input data.

3. The method of claim 2, further comprising periodically sorting the large dictionary based on the usage data to determine a set of most repeating ones of the data chunks in the input data and, based on the sorting, updating the small dictionary to include entries for at least a portion of the determined set of most repeating ones of the data chunks.

4. The method of claim 1, further comprising when no entry is found, creating a new entry in the small dictionary for the hash value, whereby the small dictionary is generated to initially include hash values based on first received ones of the data chunks.

5. The method of claim 4, further comprising when an entry is found for one of the data chunks in the small dictionary, determining whether the signature for the data chunk matches a signature in the found entry and when a signature match is determined increasing a counter value and returning data reference information.

6. The method of claim 5, further comprising calculating a first index to the small dictionary for each of the data chunks based on a transformation of the hash value, wherein the determining of a signature match includes comparing the entry associated with the index with the signature for each of the data chunks.

7. The method of claim 6, further comprising:
when a signature match is not determined, generating a next index by next transforming the hash value;
creating an entry for the data chunk when no entry is found at the next index in the small dictionary;
determining a signature match when an entry is found at the next index;
when no signature match is found at the next index entry, performing a cache replacement determination for the entry in the small dictionary; and
based on the cache replacement determination, replacing the entry with data for the data chunk associated with the hash value or retaining the entry in the small dictionary.

8. A data deduplication system, comprising
a processor managing memory;
a hash dictionary stored in the memory;
a dictionary generation mechanism run by the processor to build the hash digest dictionary including adding entries for a set of hash digest values associated with a set of most repeating data chunks identified in a data pool; and
a lookup mechanism run by the processor to first lookup hash digest values associated with chunks of the data pool in the hash digest dictionary and when no duplicate is found, to second lookup the hash digest values associated with the chunks in a large dictionary stored in a non-volatile data storage device to determine when one of the data chunks is a duplicate of a previously stored unique data chunk.

9. The system of claim 8, wherein the dictionary generation mechanism initially defines the set of most repeating data chunks using first received ones of the chunks from the data pool.

10. The system of claim 9, wherein the set of most repeating data chunks is initially defined by receiving a stream of the chunks, generating an index to the hash digest dictionary based on the hash digest value for each of the chunks, and when no entry is present in the hash digest dictionary at the index creating a new entry for the associated chunk.

11. The system of claim 10, further wherein the set of most repeating chunks is defined by when an entry is present in the hash digest dictionary at the index and the hash digest value matches increasing a counter, when an entry is present and the hash digest value does not match, generating a next index for the chunk and performing an additional lookup to the hash digest dictionary, and when an index collision is detected performing an entry replacement determination to decide whether to replace an existing entry at the next index with the chunk associated with the lookup.

12. The system of claim 8, further comprising a small dictionary optimization mechanism run by the processor to sort the large dictionary to identify a determined set of most repeating chunks in the data pool and to modify the hash digest dictionary to include a set of entries associated with at least a portion of the determined set of most repeating chunks.

13. A non-transitory computer readable medium for performing in-line data deduplication of a data pool, comprising:
computer readable medium causing a computer to process a data set to generate a plurality of chunks of data;
computer readable medium causing the computer to generate a hash value for each of the data chunks;
computer readable medium causing the computer to process the data chunks to generate, and store in processor memory, a small dictionary comprising entries for a number of the data chunks including an associated one of the hash values, wherein the data chunks associated with the entries of the small dictionary correspond to most repeating ones of the hash values; and computer readable medium causing the computer to first access the small dictionary to determine when one of the data chunks is a duplicate of a previously stored unique data chunk and to second access a large dictionary to determine when one of the data chunks is a duplicate of a previously stored unique data chunk.

14. The computer readable medium of claim 13, wherein the most repeating ones of the hash values are initially set to a number of first received and differing ones of the hash values, whereby the small dictionary is built with earliest received portions of the data chunks.

15. The computer readable medium of claim 13, wherein the generating of the small dictionary comprises assigning an index to each of the hash values, creating new entries in the small dictionary when no entry is found at the index, incrementing a counter for one of the entries when an entry is found with a matching hash value, and performing an entry replacement algorithm when an entry is found with a non-matching hash value.

16. The computer readable medium of claim 13, wherein the entry replacement algorithm comprises comparing the counter of the corresponding entry with a threshold value and replacing the corresponding entry with the hash value used in the first access when the threshold is not exceeded.

17. The computer readable medium of claim 13, wherein the large dictionary comprises entries for each of the data chunks processed by the access code devices including occurrence data and further comprising computer readable medium causing the computer to sort the entries based on the occurrence data to determine most repeating ones of the data chunks of the processed data chunks and causing the computer to modify the small dictionary based on the determined most repeating ones of the data chunks.

18. The computer readable medium of claim 17, wherein the processor memory is volatile memory and wherein the large dictionary is stored in non-volatile memory accessible by the computer.

* * * * *